US011680122B2

(12) United States Patent
Wu et al.

(10) Patent No.: US 11,680,122 B2
(45) Date of Patent: Jun. 20, 2023

(54) EMULSION POLYMERS AND LOW VOC COATING COMPOSITIONS MADE THEREFROM

(71) Applicant: Arkema Inc., King of Prussia, PA (US)

(72) Inventors: Wenjun Wu, Cary, NC (US); Karen L. Wallace, Raleigh, NC (US); Jeanne L. Stallings, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 338 days.

(21) Appl. No.: 17/176,459

(22) Filed: Feb. 16, 2021

(65) Prior Publication Data

US 2021/0253868 A1 Aug. 19, 2021

Related U.S. Application Data

(63) Continuation of application No. 15/777,690, filed as application No. PCT/US2016/064159 on Nov. 30, 2016, now abandoned.

(60) Provisional application No. 62/261,958, filed on Dec. 2, 2015.

(51) Int. Cl.
| | |
|---|---|
| *C09D 5/02* | (2006.01) |
| *C09D 133/14* | (2006.01) |
| *C09D 143/02* | (2006.01) |
| *C08F 220/12* | (2006.01) |
| *C08F 220/14* | (2006.01) |
| *C08F 220/18* | (2006.01) |

(52) U.S. Cl.
CPC ...... *C08F 220/1804* (2020.02); *C08F 220/12* (2013.01); *C08F 220/14* (2013.01); *C09D 5/02* (2013.01); *C09D 133/14* (2013.01); *C09D 143/02* (2013.01); *C08F 2800/10* (2013.01)

(58) Field of Classification Search
CPC ...... C09D 5/02; C09D 133/14; C09D 143/02; C08F 220/12; C08F 2800/10; C08F 220/1804; C08F 220/14
USPC ...................................................... 524/558
See application file for complete search history.

(56) References Cited

U.S. PATENT DOCUMENTS

| | | |
|---|---|---|
| 3,736,287 A | 5/1973 | Patella |
| 3,749,690 A | 7/1973 | Patella |
| 4,325,856 A | 4/1982 | Ishikawa et al. |
| 5,312,863 A | 5/1994 | Van Rheenen et al. |
| 5,679,719 A | 10/1997 | Klemarczyk et al. |
| 6,485,762 B1 | 11/2002 | Rizvi et al. |
| 6,485,785 B1 | 11/2002 | Mino et al. |
| 6,485,786 B2 | 11/2002 | Deng et al. |
| 6,534,597 B2 | 3/2003 | Adam et al. |
| 6,710,161 B2 | 3/2004 | Bardman et al. |
| 6,756,459 B2 | 6/2004 | Larson et al. |
| 8,158,713 B2 | 4/2012 | Finegan et al. |
| 8,158,714 B2 | 4/2012 | Nair et al. |
| 8,318,848 B2 | 11/2012 | Finegan et al. |
| 8,853,181 B2 | 10/2014 | Sharp et al. |
| 2012/0058277 A1 | 3/2012 | Bohling et al. |
| 2015/0051334 A1* | 2/2015 | Wu .......................... C08F 2/26 524/533 |
| 2015/0232685 A1 | 8/2015 | Wang et al. |

FOREIGN PATENT DOCUMENTS

| | | | | |
|---|---|---|---|---|
| CA | 2005640 A | * | 6/1990 | ............ C08F 220/18 |
| CA | 2771572 A1 | * | 10/2012 | ........... C09D 143/02 |
| CN | 103555174 | | 2/2014 | |
| EP | 1 988 105 A1 | | 11/2008 | |
| EP | 1 582 567 B2 | | 11/2011 | |
| KR | 20110089425 A | * | 8/2011 | |

OTHER PUBLICATIONS

U.S. Appl. No. 15/777,696, filed May 21, 2018, Wu.

* cited by examiner

*Primary Examiner* — Kelechi C Egwim
(74) *Attorney, Agent, or Firm* — Lynn B. Morreale

(57) ABSTRACT

Emulsion polymers and coating compositions made therefrom that exhibit exceptional roller stability and stain resistance to both hydrophilic and hydrophobic stains, without sacrificing scrub resistance. The emulsion polymers include, as polymerized units formed at a pH between 3 and 9:

a) at least one nonionic or anionic unsaturated monomer in an amount ranging between about 78 wt. % to less than 100 wt. % based on the overall weight of the polymer composition b) one or more strong acid monomer in an amount ranging from about 0.01 wt. % to 2 wt. % based on the overall weight of the polymer composition; and c) at least one lower alkyl acrylate monomer in an amount ranging between about 1 wt. % to 20 wt. % based on the overall weight of the polymer composition.

18 Claims, No Drawings

EMULSION POLYMERS AND LOW VOC COATING COMPOSITIONS MADE THEREFROM

This application is related to and claims the benefit of U.S. Ser. No. 15/777,690, filed May 21, 2018, which is related to and claims priority to PCT Application PCT/US2016/064159, filed Nov. 30, 2016, which claims priority to U.S. Provisional Application No. 62/261,958, entitled EMULSION POLYMERS AND LOW VOC COATING COMPOSITIONS MADE THEREFROM filed on Dec. 2, 2015, the contents of which are incorporated herein by reference.

FIELD OF THE INVENTION

This disclosure relates generally to emulsion polymers used in coatings, adhesives, sealants, and the like. More specifically, this disclosure relates to coating compositions that include emulsion polymers that enhance stability of the coating composition and provide the resulting film or coating layer with resistance to hydrophilic and hydrophobic stains.

BACKGROUND OF THE INVENTION

The statements in this section merely provide background information related to the present invention and may not constitute prior art.

Driven by lower VOC requirements, softer polymers with low minimum film formation temperature (MFFT) are increasingly being utilized in waterborne architectural coatings. However, coating compositions based on these polymers result in soft and tacky coating layers or films that exhibit high soiling tendency and poor wash and burnish resistance. Washability, which defines a coating's ability to withstand a scrubbing action designed to remove a stain without changing the appearance or protective functions of the coating, is a desirable property that is lacking in most commercial latex paints. This property is particularly hard to attain in "flat" interior wall paints.

Adding to this challenge is the wide variation in chemical and physical characteristics exhibited by household stains that are encountered. A coating formulation is often optimized for hydrophobic stain washability at the expense of hydrophilic stain removal or vice versa. Since one mechanism of stain removal involves the mechanical erosion of the paint layer or film, a latex paint that exhibits good stain removal often exhibits poor scrub resistance.

Polymers that contain strong acid groups are used in a variety of coatings, inks, and adhesives. The strong acid groups provide for improved adhesion of the polymer to substrates, form crosslinks in the presence of divalent metal ions, and promote adsorption of the polymer onto pigment particles, such as titanium dioxide. U.S. Pat. Nos. 8,158,713 and 8,318,848 provide waterborne coating compositions that include a vinyl copolymer having phosphorous-containing functional groups. U.S. Pat. No. 6,485,786 discloses an aqueous stain-blocking coating composition that includes an aqueous emulsion copolymer having polymerized units derived from an ethylenically unsaturated nonionic monomer and an ethylenically unsaturated strong acid monomer. U.S. Pat. No. 6,710,161 describes a polymer composition that includes co-polymer particles bearing phosphorus acid groups dispersed in an aqueous medium. EP Patent No. 1,988,105 discloses an aqueous copolymer dispersion obtained from a mixture of an ethlenically unsaturated nonionic monomer, a phosphorous-containing monomer, an alkoxysilane functional monomer, and a sulfur-based monomer. U.S. Pat. Nos. 3,736,287 and 3,749,690 describe an aqueous polymer emulsion derived from the interpolymerization of a short-chain alpha, beta-unsaturated mono- or polycarboxylic acid, acrylonitrile, a short-chain alpha, beta-unsaturated amide, an alkyl acrylate, and vinyl acetate or an alkyl methacrylate.

SUMMARY OF THE INVENTION

The present invention generally provides an emulsion polymer comprising, as polymerized units: a) at least one nonionic or anionic unsaturated monomer in an amount ranging between about 78 to less than 100 wt. %, preferably about 79 to 99.5 wt. %, based on the overall weight of the polymer composition; b) one or more strong acid monomer in an amount ranging from about 0.01 to 2 wt. %, preferably 0.01 to 1.5 wt. %, based on the overall weight of the polymer composition; and c) at least one lower alkyl acrylate monomer in an amount ranging between about 1 to 20 wt. % based on the overall weight of the polymer composition. The polymerized units are formed at a pH between 3 and 9, preferably between 3 and 8.

According to one aspect of the present disclosure, the ethylenically unsaturated monomer may be without limitation any (meth)acrylates, unsubstituted and substituted vinyl esters, unsubstituted and substituted styrene, carboxylic or dicarboxylic acids or amides, or a mixture thereof, while the strong acid monomer may be without limitation (meth) acrylic acid, maleic acid, fumaric acid, itaconic acid, crotonic acid, cinnamic acid, ethyl methacrylate phosphate, phosphate esters of polyethylene glycol mono(meth)acrylate, phosphate esters of polypropylene glycol mono(meth) acrylate, or a mixture thereof, and the lower alkyl acrylate monomer is methyl acrylate, ethyl acrylate, propyl acrylate, or a mixture thereof.

According to another aspect of the present disclosure, a coating composition is provided that comprises the emulsion polymer dispersed in an aqueous medium. The emulsion polymer may be present in an amount ranging from about 5 to 70 wt. %, alternatively, 10 to 60 wt. %, or preferably 20 to 60 wt %, based on the entire weight of the coating composition. The coating composition may further comprise an organic pigment, and inorganic pigment, or a mixture thereof. When desirable, the coating composition may also comprise one or more additives, including but not limited to, surfactants, dispersants, extenders, rheology modifiers, defoamers, coalescent agents, and opacifiers. The coating composition comprises less than about 50 grams per liter of a volatile organic compound (VOC).

According to yet another aspect of the present disclosure, a method of using the coating composition includes applying the composition to a surface of a substrate to form a film or coating layer on the surface, such that the film or coating layer is resistant to hydrophilic stains and hydrophobic stains. The total ΔE measured for the resistance of the coating composition to the hydrophilic stains and hydrophobic stains is less than about 80. The total ΔE measured for the resistance of the coating composition to hydrophilic stains is less than about 40. The total ΔE measured for the resistance of the coating composition to hydrophobic stains is less than about 35. In some embodiments, the total ΔE measured for the resistance of the coating composition to the consumer union stain is less than about 1.5. The hydrophilic stains include mustard, ketchup, wine, coffee, and fountain ink, while the hydrophobic stains include ballpoint pen, No.

2 pencil, blue crayon, grease pencil, 2 red lipsticks (lipstick #1, and lipstick #2) and a consumer union black stain.

According to yet another aspect of the present disclosure, roller stability of the coating is four (4) cycles.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is in no way intended to limit the present disclosure or its application or uses. For example, the emulsion polymers made and used in coating compositions according to the teachings contained herein is described throughout the present disclosure in conjunction with an architectural paint in order to more fully illustrate the composition and the use thereof. The incorporation and use of such emulsion polymers as coating compositions used in other applications or as an adhesive, a caulk, a sealant, a mastic, or the like are contemplated to be within the scope of the present disclosure. It should be understood that throughout the description, corresponding reference numerals or letters indicate like or corresponding parts and features.

In the context of the present disclosure, washability or stain removal refers to a coating's ability to withstand a scrubbing action that removes the staining material(s) without changing the coating's appearance or protective function. The term "nonionic monomer" as used herein is meant to indicate that the monomer does not bear an ionic charge within the pH range of 2 to 10. The term "anionic monomer" as used herein means being ethylenically unsaturated mono- or di-carboxylic acid monomer The present disclosure generally provides emulsion polymers and coating compositions made therefrom, as well as uses thereof. The emulsion polymers comprise, consist of, or consist essentially of an emulsion polymer having, as polymerized units: (a) at least one ethylenically unsaturated monomers in an amount ranging from about 78 wt. % to less than 100 wt. %; (b) one or more strong acid monomers in an amount ranging from about 0.01 to 2 wt. %; and (c) at least one lower alkyl acrylate monomer in an amount ranging between about 1 to 20 wt. % based on the overall weight of the polymer composition. According to one aspect of the present disclosure, the polymerized units are formed at a pH between 3 and 9.

The ethylenically unsaturated monomer (a) is not limited to any specific ethylenically unsaturated monomer. The ethylenically unsaturated monomers may include, without limitation, mono- or di-carboxylic acid monomer such as (meth)acrylic acid, maleic acid, fumaric acid, itaconic acid, crotonic acid, citraconic acid, cinnamic acid; (meth)acrylic ester monomers such as butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; diacetone acrylamide, methylol (meth)acrylamide, glycidyl methacrylate, 4-hydroxybutyl acrylate glycidyl ether; amino-functional and ureido-functional monomers (e.g., Norsocryl® 104, Arkema Inc., King of Prussia, Pa.); monomers bearing acetoacetoxy-functional, acetoacetamido-functional, and/or cyanoacetamido-functional groups; styrene and substituted styrenes; butadiene; ethylene, propylene, alpha-olefins such as 1-decene; vinyl acetate, vinyl propionate, vinyl butyrate, vinyl versatate esters (e.g., VeoVa™ 10 and VeoVa™ 12 from Momentive Performance Materials, CT) and other vinyl esters; and vinyl monomers such as vinyl chloride, vinylidene chloride. Alternatively, the ethylenically unsaturated monomer is butyl acrylate, methyl methacrylate, butyl methacrylate, 2-ethylhexyl acrylate, styrene, another acrylic monomer, methacrylic acid, acrylic acid, itaconic acid, or a mixture thereof. Methacrylic acid, butyl acrylate, methyl methacrylate, butyl methacrylate, styrene are preferred.

The amount of the ethylenically unsaturated nonionic monomer (a) is between about 78 wt. % and less than 100 wt. %, preferably between 79 and 99 wt. %, based on the entire weight of the emulsion polymer, wherein the term "about" refers to ±0.1, alternatively, ±0.05. Alternatively, the amount of the ethylenically, unsaturated nonionic monomer is greater than about 83 wt. %; alternatively, between about 89 to 99 wt. %.

The strong acid monomer (b) is selected as one from the group of a phosphorus-based acid monomer, a sulfur-based acid monomer, or a mixture thereof. The amount of the strong acid monomer in the emulsion polymer is within the range of about 0.1 wt. % to 2 wt. % based on the weight of the entire emulsion polymer. Alternatively, the amount of the strong acid monomer is between about 0.2 wt. % and 1.5 wt. %. When desirable, the amount of the first acid monomer is between about 0.25 wt. % and 1 wt. %, wherein the term "about" refers to ±0.1, alternatively, ±0.05.

The strong acid monomer (b) is not limited to any specific type of phosphate or sulfate or sulfonate monomer. Phosphate-based monomers include, but are not limited to, phosphoalkyl (meth)acrylates or acrylates, phospho alkyl (meth)acrylamides or acrylamides, phosphoalkyl crotonates, phosphoalkyl maleates, phosphoalkyl fumarates, phosphodialkyl (meth)acrylates, phosphodialkyl crotonates, vinyl phosphates and (meth)allyl phosphate, phosphate esters of polypropylene glycol mono(meth)acrylate or polyethylene glycol mono(meth)acrylate, polyoxyethylene allyl ether phosphate, vinyl phosphonic acid. Sulfate-based and sulfonate-based monomers include, without limitation, vinyl- and allyl-sulfonic or sulfuric acids, sulfoethyl (meth) acrylate, aryl-sulfonic or sulfuric acids, (meth)acrylamidoethane-sulfonic or sulfuric acids, methacrylamido-2-methyl propane-sulfonic or sulfuric acids, and the alkali metal salts of sulfonic and sulfuric acids, sodium styrene sulfonate, or vinyl sulfonic acid. Alternatively, the strong acid monomer is an alkyl methacrylate phosphate, such as ethyl methacrylate phosphate (PAM1); phosphate esters of polypropylene glycol monomethacrylate (PAM2); or mixtures thereof. Specific examples of PAM1 and PAM2 include, but are not limited to Sipomer® PAM 4000, Sipomer® PAM 300, Sipomer® PAM 200 and Sipomer® PAM 100 (Solvay), respectively. The Sipomer® PAM series are preferred.

The lower alkyl acrylate monomer (c) is not limited to any specific alkyl acrylate monomer, but rather the term "lower alkyl" is defined as being an alkyl group with 1-3 carbon atoms. The alkyl acrylate monomers may include, without limitation, methyl acrylate, ethyl acrylate, or propyl acrylate. Alternatively, the alkyl acrylate monomer is methyl acrylate, ethyl acrylate, or a mixture thereof. Methyl acrylate and ethyl acrylate are preferred.

The amount of the lower alkyl acrylate monomer (c) in the emulsion polymer is within the range of 1 to 20 wt. % based on the weight of the entire emulsion polymer. Alternatively, the amount of the lower alkyl acrylate monomer is between about 3 to 15 wt. %. When desirable, the amount of the alkyl acrylate monomer is between about 5 to 10 wt. %, wherein the term "about" refers to ±0.5, alternatively, ±0.1.

A non-exhaustive list of possible monomer combinations that may be polymerized or used to form the emulsion polymers according to the teachings of the present disclosure is provided in Table 1. The monomers associated with the abbreviations used in Table 1 include: butyl acrylate (BA); methyl methacrylate (MMA); another acrylic monomer (AM); ethylmethacrylate phosphate (PAM1); phosphate esters of polypropylene glycol monomethacrylate (PAM2); and methacrylic acid (MAA).

TABLE 1

Several Specific Combinations of Monomers Used to Form Emulsion Polymers

| (a) Ethylenically Unsaturated Monomer | (b) Strong Acid Monomer | (c) Lower Alkyl Acrylate Monomer |
|---|---|---|
| BA, MMA, AM, MAA | PAM1 | MA |
| BA, MMA, AM, MAA | PAM2 | MA |
| BA, MMA, AM, MAA | PAM1, PAM2 | MA |
| BA, MMA, AM, MAA | PAM1 | EA |
| BA, MMA, AM, MAA | PAM2 | EA |
| BA, MMA, AM, MAA | PAM1, PAM2 | EA |
| BA, MMA, AM, MAA | PAM1 | MA, EA |
| BA, MMA, AM, MAA | PAM2 | MA, EA |
| BA, MMA, AM, MAA | PAM1, PAM2 | MA, EA |

According to one aspect of the present disclosure, coating compositions comprising the emulsion polymers dispersed in an aqueous medium are formed. The emulsion polymers are incorporated into the coating compositions in an amount ranging from about 5 wt. % to 70 wt. % based on the total weight of the coating composition; alternatively, between about 10 wt. % and 60 wt. %. Alternatively, the amount of the emulsion polymers present in the coating composition is greater than about 10 wt. %; alternatively, less than about 55 wt. %, based on the total weight of the coating composition.

The coating compositions may further comprise a dye, a pigment, or a mixture thereof. These pigments may act as colorants, fillers, or extenders with several specific examples including, but not being limited to, carbon black, colored organic pigments, and metal oxide pigments, such as titanium dioxide, zinc oxide, clay, aluminum silicate, zinc oxide, zinc hydroxide, aluminum silicate, magnesium silicate, calcium silicate, amorphous silica, vapor phase silica, colloidal silica, alumina, aluminum hydroxide, zirconium oxide, and cerium oxide, as well as calcium carbonate, magnesium carbonate, kaolin, clay, talc, calcium sulfate, barium sulfate, and zinc carbonate.

When desirable, the coating compositions may also comprise one or more additives, including, but not limited to, surfactants, dispersants, rheology modifiers, defoamers, coalescent agents, or opacifiers. Various surfactants and defoamers may include any organic, organosilicon, and silicone molecules that are well known to one skilled-in-the-art to function in such a capacity. In order to enhance the weatherability of the film or coating formed from the coating composition, the coating composition may include hindered amines or UV absorber molecules. Several specific examples of surfactants or dispersants include without limitation ionic and nonionic compounds, such as alkyl polyglycol ethers, alkyl phenol polyglycol ethers, alkali metal or ammonium salts of alkyl, aryl or alkylaryl sulfonates, sulfates, phosphates, and the like.

The coating compositions may be applied to the surface of a substrate by any conventional application method known to one skilled in the art, including but not limited to brushing, draw-down methodology, spin coating, dip coating, flow coating, curtain coating, roller application, and spray methodology, for example, air spray, air-assisted spray, airless spray, high volume low pressure (HVLP) spray, and air-assisted airless spray. Films or coating layers formed using these coating compositions exhibit excellent resistance to a wide range of hydrophilic and hydrophobic stains. Conventional coating formulations are often optimized for hydrophobic stain washability at the expense of hydrophilic stain removal and vice versa. One benefit associated with the emulsion polymers of the present disclosure and the coating compositions formed therefrom is the capability of providing for the efficient or clean removal of both hydrophilic and hydrophobic stains, while maintaining good scrub resistance. The coating compositions formed according to the teachings of the present disclosure also exhibit enhanced roller stability.

According to another aspect of the present disclosure, in one embodiment an emulsion polymer comprising, as polymerized units:

a) at least one nonionic or anionic unsaturated monomer in an amount ranging between about 78 wt. % to less than 100 wt. % based on the overall weight of the polymer composition;

b) one or more strong acid monomer in an amount ranging from about 0.01 wt. % to 2 wt. % based on the overall weight of the polymer composition; and c) at least one lower alkyl acrylate monomer in an amount ranging from about 1 wt. % to 20 wt. % based on the overall weight of the polymer composition.

The polymerized units of the emulsion polymer are formed at a pH between 3 and 9. In this embodiment, the ethylenically unsaturated monomer is without limitation methacrylic acid, butyl acrylate, methyl methacrylate, butyl methacrylate, styrene, or a mixture thereof. The strong acid monomer may include, but not be limited to ethyl methacrylate phosphate, phosphate esters of polyethylene glycol mono(meth)acrylate, phosphate esters of polypropylene glycol mono(meth)acrylate, or a mixture thereof and the lower acrylate monomer is without limitation methyl acrylate, ethyl acrylate, propyl acrylate, or a mixture thereof.

According to a second embodiment, a coating composition is provided that comprises the emulsion polymer described in the first embodiment above dispersed in an aqueous medium. The coating composition may further comprise an organic pigment, and inorganic pigment, or a mixture thereof. When desirable, the coating composition may also comprise one or more additives selected from the group of surfactants, dispersants, extenders, rheology modifiers, defoamers, coalescent agents, and opacifiers. The emulsion polymer is present in the coating composition in amount that ranges from about 5 to 70 wt. % based on the entire weight of the coating composition; alternatively, between about 10 to 55 wt. % based on the entire weight of the coating composition. The coating composition comprises less than about 50 grams per liter of a volatile organic compound (VOC).

According to a third embodiment, a method of using the coating composition defined in the second embodiment above is provided, wherein the coating composition is applied to a surface of a substrate to form a film or coating layer on the surface that is resistant to both hydrophilic stains and hydrophobic stains. The hydrophilic stains include mustard, ketchup, wine, coffee, and fountain ink; while the hydrophobic stains include ballpoint pen, No. 2 pencil, blue crayon, grease pencil, lipstick #1 (CoverGirl Hot Passion), lipstick #2 (Maybelline Royal Red), and consumer union black stain. The total ΔE measured for the resistance of the coating composition to the hydrophilic and the hydrophobic stains is less than about 80. The total ΔE measured for the resistance of the film or coating layer to hydrophilic stains is less than about 40. The total ΔE measured for the resistance of the film or coating layer to hydrophobic stains is also less than about 40. The roller stability of the coating layer or film is at least four cycles.

1. An emulsion polymer composition comprising, as polymerized units:
    a) at least one nonionic or anionic unsaturated monomer in an amount ranging between about 78 wt. % to less than 100 wt. % based on the overall weight of the polymer composition
    b) one or more strong acid monomer in an amount ranging from about 0.01 wt. % to 2 wt. % based on the overall weight of the polymer composition; and
    c) at least one lower alkyl acrylate monomer in an amount ranging between about 1 wt. % to 20 wt. % based on the overall weight of the polymer composition.
2. The emulsion polymer according to claim 1, wherein the polymerized units are formed at a pH between 3 and 9.
3. The emulsion polymer according to any of claim 1 or 2, wherein the ethylenically unsaturated nonionic or anionic monomer is methacrylic acid, butyl acrylate, methyl methacrylate, butyl methacrylate, styrene;
    wherein the strong acid monomer is ethyl methacrylate phosphate, phosphate esters of polypropylene glycol monomethacrylate, phosphate esters of polyethylene glycol mono(meth)acrylate or a mixture thereof; and
    wherein the lower alkyl acrylate monomer is methyl acrylate, ethyl acrylate, propyl acrylate, or a mixture thereof.
4. A coating composition comprising an emulsion polymer dispersed in an aqueous medium, the emulsion polymer comprising, as polymerized units:
    a) at least one nonionic or anionic unsaturated monomer in an amount ranging between about 78 wt. % to less than 100 wt. % based on the overall weight of the polymer composition
    b) one or more strong acid monomer in an amount ranging from about 0.01 wt. % to 2 wt. % based on the overall weight of the polymer composition; and
    c) at least one lower alkyl acrylate monomer in an amount ranging between about 1 wt. % to 20 wt. % based on the overall weight of the polymer composition;
    wherein the polymerized units are formed at a pH between 3 and 9.
5. The coating composition according to claim 4, wherein the coating composition comprises less than about 50 grams per liter of a volatile organic compound (VOC).
6. The coating composition according to any of claim 4 or 5, wherein the ethylenically unsaturated nonionic or anionic monomer is methacrylic acid, butyl acrylate, methyl methacrylate, butyl methacrylate, styrene;
    wherein the strong acid monomer is ethylmethacrylate phosphate, phosphate esters of polypropylene glycol monmethacrylate, or a mixture thereof; and
    wherein the lower alkyl acrylate monomer is methyl acrylate, ethyl acrylate, propyl acrylate, or a mixture thereof.
7. The coating composition according to any of claims 4-6, wherein the coating composition further comprises an organic pigment, and inorganic pigment, or a mixture thereof.
8. The coating composition according to any of claims 4-7, wherein the coating composition further comprises one or more additives selected from the group of surfactants, dispersants, extenders, rheology modifiers, defoamers, coalescent agents, and opacifiers.
9. The coating composition according to any of claims 4-8, wherein the emulsion polymer is present in an amount ranging from about 5 to 70 wt. % based on the entire weight of the coating composition.
10. The coating composition according to claim 9, wherein the emulsion polymer is present in an amount ranging from about 10 to 50 wt. % based on the entire weight of the coating composition.
11. A method of using the coating composition according to any of claims 4-10, wherein the coating composition is applied to a surface of a substrate to form a film or coating layer on the surface;
    wherein the film or coating layer is resistant to both hydrophilic stains and hydrophobic stains,
    wherein the hydrophilic stains include mustard, ketchup, wine, coffee, and fountain ink;
    wherein the hydrophobic stains include ballpoint pen, No. 2 pencil, blue crayon, grease pencil, lipstick #1 (CoverGirl Hot Passion), lipstick #2 (Maybelline Royal Red), and consumer union black stain.
12. The method according to claim 11, wherein the total ΔE measured for the resistance of the film or coating layer to the hydrophilic and the hydrophobic stains is less than about 80.
    The method according to claim 12, wherein the total ΔE measured for the resistance of the film or coating layer to hydrophilic stains is less than about 40;
    The method according to claim 12, wherein the total ΔE measured for the resistance of the film or coating layer to hydrophobic stains is less than about 35.
13. The method according to any of claim 11-14, wherein the roller stability of the coating layer or film is at least four cycles.

The following specific examples are given to further illustrate the preparation and testing of emulsion polymers and coating formulations containing the emulsion polymers according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

Example 1: Emulsion Polymer Composition and Method for Preparing Thereof

Comparative Sample 1 is prepared by adding a total of 17.9 gram of a seed latex and 495 gram water into a three-liter, jacketed glass reactor equipped with dual impellers, reflux condensers, and stainless steel feed lines. The reactor is then heated to 65° C. A monomer mixture containing 594.5 gram butyl acrylate (BA), 526.2 gram methyl methacrylate (MMA), 23.6 gram acrylic monomer (Norsocryl® 104, Arkema Inc., King of Prussia, Pa.), and 8.7 gram methacrylic acid (MAA) are combined with water and then emulsified using equal active amounts of sodium dodecylbenzene sulfonate and alkyldiphenyloxide disulfonate under agitation.

The polymerization is initiated at 65° C. using t-butyl hydroperoxide (t-BHP) solution as an oxidizer and sodium metabisulfite (SMBS) as a reducer. Commencing simultaneously, monomer pre-emulsion, ammonium hydroxide solution, oxidizer and reducer solutions are fed to the reactor over a period of 210 minutes and 220 minutes, respectively. The temperature is maintained at 80° C. after initiation. At the end of oxidizer and reducer feeds, the reactor is held at 75° C. for 30 minutes. Then, additional t-BHP and SMBS solutions are fed over 60 minutes to lower the amount of residual monomers. The pH of the resulting latex is adjusted to 8.0-9.0 with 28% ammonium hydroxide. The solid content of the latex is ~50%. The emulsion polymer may then be collected or stored as an aqueous dispersion or latex.

Comparative Sample 2 is prepared using the same procedure as described in Comparative Sample 1, except that the monomer mixture contained 567.8 gram BA, 495.2 gram MMA and 57.7 gram Methyl Acrylate (MA) while keeping the MAA and Norsocryl® 104 amounts the same to maintain a similar calculated polymer glass transition temperature (Tg) using the Fox equation as the guide.

Comparative Sample 3 is prepared using the same procedure as described in Comparative Sample 1, except that the monomer mixture contained 553.3 gram BA, 509.7 gram MMA and 57.7 gram Ethyl Acrylate (EA) while keeping the MAA and Norsocryl® 104 amounts the same.

Comparative Sample 4 is prepared using the same procedure as described in Comparative Sample 1, except that the monomer mixture contained 511.5 gram BA, 493.9 gram MMA and 115.3 gram Ethyl Acrylate (EA) while keeping MAA and Norsocryl® 104 amounts the same.

Comparative Sample 5 is prepared using the same procedure as described in Comparative Sample 1, except that the monomer mixture contained 596.6 gram BA, 512.6 gram MMA, 23.6 gram Norsocryl® 104, 8.7 gram MAA, and 5.7 gram ethyl methacrylate phosphate (PAM1).

Test Samples 6 and 7 are prepared using the same procedure as Comparative Sample 5, except that the MMA amount is reduced to 455.4 gram to compensate for the inclusion of 57.2 gram Methyl Acrylate (MA) and 57.2 gram Ethyl Acrylate (EA), respectively.

Test Sample 8 is prepared using the same procedure as Test Samples 6 & 7, except that an equal amount of phosphate esters of polypropylene glycol monomethacrylate (PAM2) replaced ethylmethacrylate phosphate (PAM1).

Test Sample 9 is prepared using the same procedure as Test Sample 8, except that the MMA amount is further reduced to 398.2 gram to compensate for the inclusion of 114.2 gram Ethyl Acrylate (EA).

The amount of PAM1, PAM2, MA, and/or EA utilized in the comparative samples 1-5 and the test samples 6-9 are summarized in Table 2 as a weight percentage based on the weight of the total monomer mixture, which also contains butyl acrylate (BA), methyl methacrylate (MMA), acrylic monomer (Norsocryl® 104, Arkema Inc., King of Prussia, Pa.), and methacrylic acid (MMA). The total solids content associated with the emulsion polymers is also provided in Table 2 along with the volume average ($M_v$) and number average ($M_n$) particle size for the collected polymer samples measured on Nanotrac UPA150 (Microtrac).

TABLE 2

Composition & Properties of Comparative and Test Emulsion Polymer Samples

| | Comparative Samples | | | | | Test Samples | | | |
|---|---|---|---|---|---|---|---|---|---|
| BOTM* | 1 | 2 | 3 | 4 | 5 | 6 | 7 | 8 | 9 |
| PAM1, (%) | 0 | 0 | 0 | 0 | 0.5 | 0.5 | 0.5 | 0 | 0.5 |
| PAM2, (%) | 0 | 0 | 0 | 0 | 0 | 0 | 0 | 0.5 | 0 |
| MA, (%) | 0 | 5 | 0 | 0 | 0 | 5 | 0 | 5 | 0 |
| EA, (%) | 0 | 0 | 5 | 10 | 0 | 0 | 5 | 0 | 10 |
| Total Solids, (%) | 50.2 | 51.1 | 50.9 | 50.4 | 50.4 | 49.7 | 49.8 | 50.3 | 50 |
| Mv (micron) | 0.135 | 0.132 | 0.138 | 0.134 | 0.137 | 0.137 | 0.137 | 0.136 | 0.137 |
| Mn (micron) | 0.111 | 0.107 | 0.115 | 0.119 | 0.117 | 0.115 | 0.119 | 0.119 | 0.115 |

*BOTM = Based on Total Monomers, MA = methyl acrylate, EA = ethyl acrylate, PAM1 = Sipomer® PAM 4000, and PAM2 = Sipomer® PAM 200

Example 2: Paint Samples Formed Using the Emulsion Polymer Compositions

The comparative emulsion polymer samples 1-5 and test emulsion polymer samples 6-9 prepared in Example 1 are used in the preparation of paint samples A-I. Each paint sample, which is comprised of the composition described in Table 3, is prepared using the same procedure, with the only exception being the composition of the emulsion polymer sample incorporated therein. Each paint sample is prepared by mixing the titanium dioxide slurry with coalescent, dispersant and water using a dispersator at low speed, followed by additions of ammonia, defoamer, and extender pigments. The mixture of above ingredients was then mixed at a higher speed till an acceptable Hegman fineness reading was achieved. The dispersator speed was then reduced and final additions of opaque polymer and thickeners were made to produce the paint base. The paint base was weighed out into pint-sized cans, to which appropriate amounts of latex, coalescent, and water were added. Paints were stirred on a bench top lab mixer for 5 minutes before initial KU viscosity and pH were measured. The paint samples A-I are collected and stored for testing.

TABLE 3

Composition for Paint Samples A-I.

| | Materials | Amount (grams) |
|---|---|---|
| Grind | Water | 75.8 |
| | Rutile TiO2 Slurry | 287.6 |
| | Nonionic Surfactant | 3 |
| | Ammonia AQ 28% | 0.5 |
| | Pigment Dispersant | 16.7 |
| | Sodium-Potassium Alumina Silicate Extender | 172.3 |
| | Calcined Kaolin Extender | 98.5 |
| | Attagel ® Rheology Modifier | 3 |
| | Defoamer | 1 |
| Let Down | Emulsion Polymer Sample (1, 2, 3, 4, 5, or 6) | 324 |
| | Aquaflow ® NHS310 Rheology Modifier | 20.7 |
| | Polyurethane Rheology Modifier | 5.4 |
| | Coalescent | 6.6 |
| | Opacifier | 41.2 |
| | Water | 118.7 |

Example 4: Testing the Stain Resistance, Roller Stability, & Scrub Resistance of Paint Samples The Paint Samples A-I as prepared in Example 2 are evaluated for resistance to staining, roller stability, and scrub resistance. Roller Stability is assessed by filling half-pint paint cans with a coating composition so that the can is ⅔ full. The paint can is then sealed and placed on a mechanical roller at 25 rpm for a period of 16 to 24 hours. The paint cans are subsequently removed from the roller, and the viscosity in Krebs units (KU) of the coating composition is re-measured and compared to the original KU value measured prior to being subjected to the roller stability test. The process is repeated until the measured viscosity exceeds 140 KU, the coating composition solidifies, or the coating composition has been subjected to a total of four cycles.

Scrub resistance is measured according to a standard ASTM D-2486-79 method (ASTM International, West Conshohocken, Pa.) using a 7-day dry cycle. The relative scrub resistance is evaluated on a Garner Straight Line Washability and Wear Abrasion Machine. The coatings are applied with a wet film thickness of 7 mils (0.18 mm) over Leneta black plastic charts and allowed to dry for 7 days at controlled temperature (CT) and controlled relative humidity (CH) of 77° F. and 50%, respectively. The nylon bristle brushes used in the test are conditioned by running 400 cycles before the test begins. A standardized abrasive scrub media (#SC-2 from the Leneta Company) is used in the test. A total of 7 mL of the scrub media and 5 mL of water are added at the beginning of the test and after every 400 cycles. The test is done in triplicate and the number of cycles to failure is recorded. An emulsion polymer derived from a composition described in U.S. Pat. No. 8,389,061 and also prepared according to the method taught in U.S. Pat. No. 8,389,061 is employed as a scrub control for each test panel evaluated.

Stain resistance is measured by determining the degree to which a stain can be removed from a film or coating layer according to a modified ASTM D-4828 method. More specifically, a 7-mil wet paint film is cast onto a black Leneta scrub chart and dried for a minimum of three days in a controlled temperature & humidity (CT/CH) chamber. Five hydrophilic stains (mustard, ketchup, hot coffee, red wine, and blue fountain ink) and seven hydrophobic stains (ball point pen, #2 pencil, blue crayon, grease pencil, and two red lipsticks as well as the Consumers Union black stain), are included in the test. Mustard, ketchup, and Consumer Union (CU) black stains are applied using a 10 mil square draw-down bar. For coffee, red wine, and fountain ink, a strip of a single ply paper towel is used to hold the liquid stains in place. Other hydrophobic stains are directly marked onto the scrub panels. A coating or film formed from a commercial paint may be used as a control.

All stains are allowed to sit on the paint film for two hours while the Consumers Union (CU) stain is held in place for 24 hours. The films are washed for 100 cycles using ASTM standard sponges and Leneta standardized Non-Abrasive Scrub Media as the cleaning solution. Fantastik® (S.C. Johnson Company) is the cleanser for the CU stain, which is washed for 25 cycles on a Gardner Wear Abrasion machine. The degree of staining is assessed using the ΔE values of unstained versus stained and then washed portions of the paint film, measured by a BYK Gardner spectrophotometer. The measurement is taken in triplicate and then averaged. Small ΔE values are desirable, denoting slight or no residual staining of the paint surface. The measurement of the ΔE associated with each type of stain formed on and removed from the different paint samples is provided in Table 4.

Referring to Table 4, the Krebs viscosity measured for the test samples F-I is about the same as the Krebs viscosity measured for the comparative samples A-E. In general, the individual ΔE values measured for the removal of the same stains on comparative samples A-E are observed to be higher than the corresponding values measured for test samples F-I.

TABLE 4

The Measurement of Paint Properties and ΔE for Various Stains Removed From Paint Samples A-I

|  | Paint Sample | | | | | | | | |
| --- | --- | --- | --- | --- | --- | --- | --- | --- | --- |
|  | A | B | C | D | E | F | G | H | I |
| Emulsion Polymer | 1 | 2 | 3 | 4 | 5 | 6 | 7 | 8 | 9 |
| KU | 111 | 104 | 109 | 106 | 106 | 103 | 105 | 103 | 102 |
| ICI, (P) | 1 | 0.9 | 1 | 1 | 0.9 | 0.9 | 0.9 | 0.9 | 0.9 |
| 60° Gloss | 3 | 2.8 | 2.9 | 2.9 | 3 | 3 | 3 | 2.8 | 2.9 |
| 85° Gloss | 2.8 | 2.6 | 2.7 | 2.6 | 2.7 | 2.2 | 2.4 | 2.6 | 2.3 |
| Hydrophilic Stain Removal | | | | | | | | | |
| Mustard | 11.94 | 12.09 | 11.11 | 10.39 | 11.71 | 3.16 | 8.51 | 7.6 | 11.14 |
| Ketchup | 0.84 | 0.85 | 1.31 | 0.78 | 1.7 | 1.1 | 1.11 | 1.19 | 0.8 |
| Wine | 7.78 | 7.45 | 7.52 | 7.4 | 6.91 | 5.25 | 4.67 | 5.02 | 5.05 |
| Coffee | 9.03 | 6.82 | 8.27 | 7.88 | 9.01 | 7.59 | 8.37 | 7.8 | 7.62 |
| Fountain Ink | 16.95 | 21.04 | 15.87 | 17.42 | 11.32 | 8.35 | 10.46 | 8.67 | 10 |
| Hydrophobic Stain Removal | | | | | | | | | |
| Ballpoint pen | 8.14 | 7.87 | 5.93 | 6.17 | 4.79 | 6.98 | 4.61 | 4.37 | 5.26 |
| No. 2 pencil | 2.12 | 3.12 | 2.06 | 3.15 | 2.45 | 2.16 | 2.21 | 1.95 | 2.57 |
| Blue Crayon | 10.04 | 10.09 | 9.91 | 8.51 | 11.63 | 4.21 | 6.4 | 4.95 | 4.91 |
| Grease Pencil | 15.46 | 13.37 | 14.69 | 12.92 | 15.05 | 12.52 | 16.8 | 12.54 | 14.9 |
| Lipstick #1 | 3.25 | 2.56 | 2.53 | 2.34 | 3.21 | 2.78 | 2.2 | 1.91 | 3.33 |
| Lipstick #2 | 1.56 | 1.65 | 2.55 | 1.41 | 1.51 | 1.47 | 1.63 | 1.89 | 1.63 |
| Consumer Union (CU) Stain | 2.75 | 2.01 | 2.43 | 1.93 | 2.12 | 1.34 | 1.41 | 1.3 | 1.15 |

A summary of the total value of the measured ΔE for test paint samples F-I is provided in Table 5 along with a summary of the roll stability and scrub resistance. The total ΔE measured for the resistance of the coating composition to the hydrophilic stains and hydrophobic stains is less than about 80 for test paint samples F-I; alternatively, less than about 75. The total ΔE measured for the resistance of the coating composition (test samples F-I) to the hydrophilic stains is less than about 40; alternatively, less than about 35. The total ΔE measured for the resistance of the coating composition (test samples F-I) to the hydrophobic stains is less than about 45; alternatively, less than about 35. In comparison, the total ΔE values measured for the removal of the same stains on comparative paint samples A-E are observed to be usually higher than the values measured for test paint samples F-I. The lower ΔE values are obtainable without sacrificing scrub resistance as demonstrated by the similarity in the number of scrub cycles measured for the test samples F-I and the control sample, as well as comparative samples A-E. Finally, the roller stability of the test samples F-I passed 4 cycles, while the comparative samples A-E failed after only 1 or 2 cycles. Thus the test samples F-I exhibit improved roll stability as compared to the comparative samples A-E.

TABLE 5

Summary of the Total Stain Removal (ΔE), Roll Stability, and Scrub Resistance Measured For Paint Samples A-I

| | Paint Sample | | | | | | | | |
|---|---|---|---|---|---|---|---|---|---|
| | A | B | C | D | E | F | G | H | I |
| Emulsion Sample | 1 | 2 | 3 | 4 | 5 | 6 | 7 | 8 | 9 |
| b/c (PAM/MAA) | 0 | 0.66 | 0.66 | 0.66 | 0.66 | 0.66 | 0.66 | 0.66 | 0.66 |
| Total ΔE (Hydrophilic and Hydrophobic stains) | 89.85 | 88.93 | 84.18 | 80.30 | 81.42 | 56.91 | 68.38 | 59.19 | 68.36 |
| Scrub cycles (vs. control at 789) | 920 | 1129 | 1156 | 1015 | 712 | 941 | 892 | 782 | 766 |
| Roller Stability | 1 | 2 | 1 | 2 | 1 | 4 | 4 | 4 | 4 |

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A single stage emulsion polymer composition comprising, as polymerized units:
   a) at least one nonionic or anionic unsaturated monomer in an amount ranging between about 78 wt. % to less than 100 wt. % based on the overall weight of the polymer composition;
   b) one or more strong acid monomer in an amount ranging from about 0.01 wt. % to 2 wt. % based on the overall weight of the polymer composition which is selected from the group consisting of phosphorus-based acid monomer, sulfur-based acid monomer, and a mixture thereof; and
   c) at least one lower alkyl acrylate monomer which is a C1-C3 alkyl acrylate in an amount ranging between about 1 wt. % to 20 wt. % based on the overall weight of the polymer composition and which is different from said at least nonionic or anionic unsaturated monomer 1a),
   wherein the polymerized units are formed in a single stage process at a pH between 3 and 9.

2. The emulsion polymer according to claim 1, wherein the at least one ethylenically unsaturated nonionic or anionic monomer 1a) is methacrylic acid, acrylic acid, butyl acrylate, methyl methacrylate, butyl methacrylate, or styrene.

3. The emulsion polymer according to claim 1, wherein the strong acid monomer 1b) is selected from the group consisting of ethyl methacrylate phosphate, phosphate esters of polypropylene glycol monomethacrylate, phosphate esters of polyethylene glycol mono(meth)acrylate, or a mixture thereof.

4. The emulsion polymer according to claim 1, wherein the lower alkyl acrylate monomer 1c) is methyl acrylate, ethyl acrylate, or a mixture thereof.

5. The emulsion polymer according to claim 1 wherein the at least one ethylenically unsaturated nonionic or anionic monomer 1a) are methacrylic or acrylic acid, and at least one moiety selected from the group consisting of butyl acrylate, methyl methacrylate, butyl methacrylate, and styrene.

6. The emulsion polymer according to claim 1 wherein the at least one ethylenically unsaturated nonionic or anionic monomer 1a) are (i) methacrylic or acrylic acid, (ii) at least one moiety selected from the group consisting of butyl acrylate, methyl methacrylate, butyl methacrylate, and styrene, and (iii) another acrylic monomer different from 1a)(i) and 1a)(ii).

7. The emulsion polymer according to claim 6 wherein said another acrylic monomer 1a)(iii) is selected from the group consisting of 2-ethylhexyl acrylate, decyl acrylate, lauryl acrylate, isodecyl methacrylate, lauryl methacrylate, hydroxyethyl methacrylate, hydroxypropyl methacrylate; (meth)acrylonitrile; (meth)acrylamide; diacetone acrylamide, methylol (meth)acrylamide, glycidyl methacrylate, and 4-hydroxybutyl acrylate glycidyl ether.

8. A coating composition comprising the single stage emulsion polymer composition of claim 1 dispersed in an aqueous medium.

9. The coating composition according to claim 8, wherein the coating composition comprises less than about 50 grams per liter of a volatile organic compound (VOC).

10. The coating composition according to claim 8, wherein the coating composition further comprises an organic pigment, and inorganic pigment, or a mixture thereof.

11. The coating composition according to claim 8, wherein the coating composition further comprises one or more additives selected from the group of surfactants, dispersants, extenders, rheology modifiers, defoamers, coalescent agents, and opacifiers.

12. The coating composition according to claim 8, wherein the emulsion polymer is present in an amount ranging from about 5 to 70 wt. % based on the entire weight of the coating composition.

13. The coating composition according to claim 8, wherein the emulsion polymer is present in an amount ranging from about 10 to 60 wt. % based on the entire weight of the coating composition.

14. A method of using the coating composition of claim 8, wherein the coating composition is applied to a surface of a substrate to form a film or coating layer on the surface;
wherein the film or coating layer is resistant to both hydrophilic stains and hydrophobic stains.

15. The method according to claim 14, wherein a total $\Delta E$ measured for the resistance of the film or coating layer to both the hydrophilic stains and hydrophobic stains is less than about 80;
wherein the hydrophilic stains include mustard, ketchup, wine, coffee, and fountain ink;
wherein the hydrophobic stains include ballpoint pen, No. 2 pencil, blue crayon, grease pencil, lipstick #1 (CoverGirl Hot Passion), lipstick #2 (Maybelline Royal Red), and a consumers union stain.

16. The method according to claim 15, wherein the total $\Delta E$ measured for the resistance of the film or coating layer to both the hydrophilic and hydrophobic stains is less than about 75.

17. The method according to claim 15, wherein the total $\Delta E$ measured for the resistance of the film or coating layer to hydrophilic stains is less than about 40.

18. The method according to claim 15, wherein the total $\Delta E$ measured for the resistance of the film or coating layer to hydrophobic stains is less than about 35.

\* \* \* \* \*